(No Model.)
W. H. B. STOUT.
ATTACHMENT FOR CAR COUPLINGS.
No. 461,288. Patented Oct. 13, 1891.
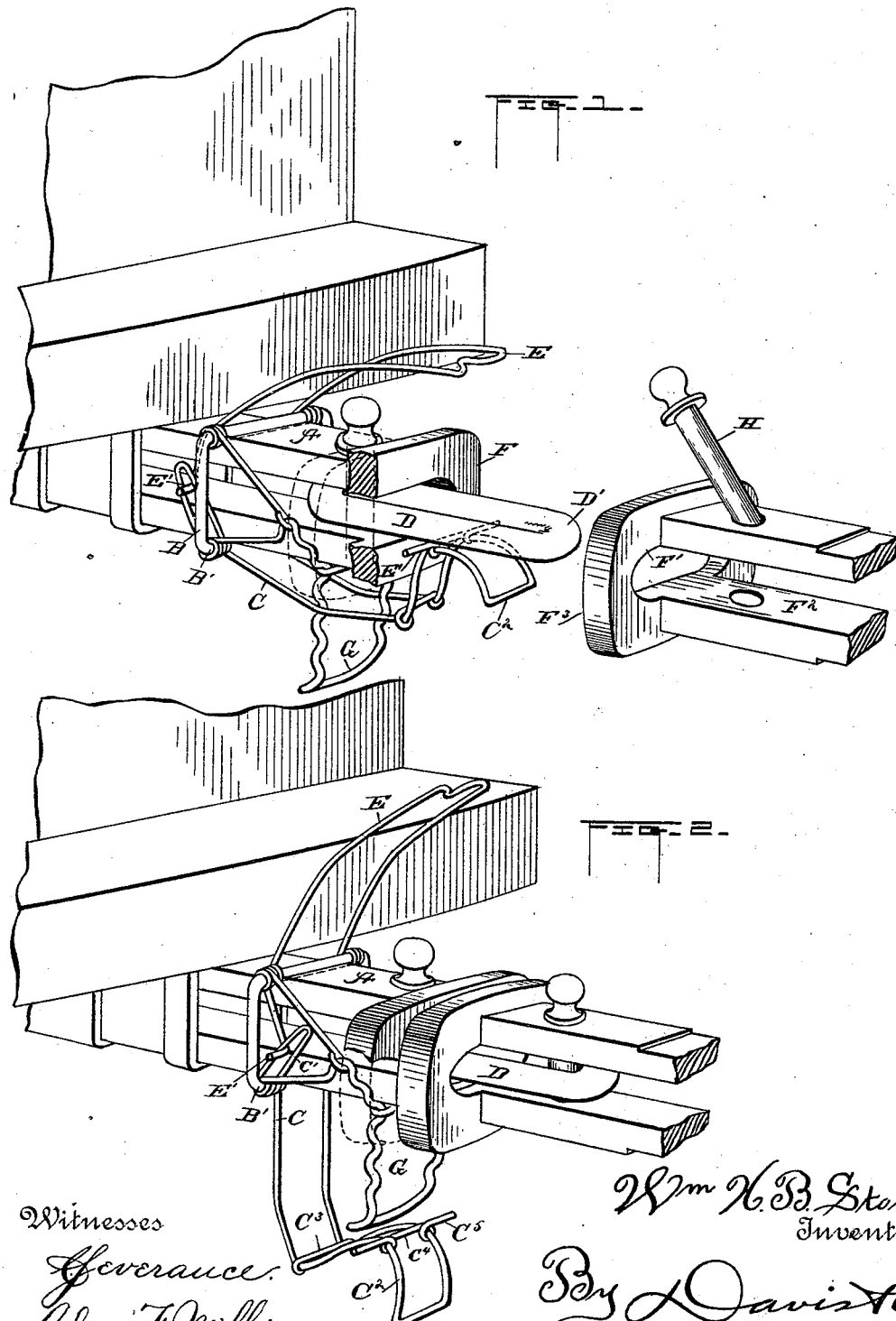

UNITED STATES PATENT OFFICE.

WILLIAM H. B. STOUT, OF CHICAGO, ILLINOIS.

ATTACHMENT FOR CAR-COUPLINGS.

SPECIFICATION forming part of Letters Patent No. 461,288, dated October 13, 1891.

Application filed July 16, 1891. Serial No. 399,724. (No model.)

*To all whom it may concern:*

Be it known that I, WILLIAM H. B. STOUT, a citizen of the United States, residing at Chicago, in the county of Cook and State of Illinois, have invented a certain new, useful, and valuable Improvement in Attachments for Car-Couplings, of which the following is a full, clear, and exact description.

My invention has for its object to provide a practical and economical attachment for car-couplings, which can be attached to any of the well-known link-and-pin couplings now in use and which serves, when in use, to hold the link and automatically drop the pin and couple the cars, thus obviating the necessity of a man standing between the cars at the risk of mashing his hands or losing his life.

In the accompanying drawings, Figure 1 is a perspective view showing a pair of car-couplings with my attachment in operative position upon one of them. Fig. 2 is a similar view showing the attachment as it appears after it has been sprung.

Like characters of reference indicate the same parts occurring in the two views.

To the draw-bar A is secured in any suitable manner the piece B, which surrounds the said draw-bar and projects on either side so as to form bearings B' for the wire coiled around it. Most draw-bars have a shoulder which prevents the part B from working forward.

Around the lower bearings B' is twisted a wire C, which projects upward and forms loops C' on either side, and then projects downward, forming the link-support $C^2$, which is braced or stayed by the cross-pieces $C^3$ and $C^4$, the latter projecting sufficiently far on either side so as to provide supporting ends $C^5$ for the link D to rest upon, as shown at Fig. 1. The wire C is so coiled and fastened at B' as to hold the link-support $C^2$ normally downward and the loops C' upward, as shown at Fig. 2.

E represents a pin-operating arm, which is coiled around the part B, as shown, and the ends of which project downward and terminate in a hook E', which works in the loops C'.

Projecting downward from the bull-nose is a scalloped-wire projection G, which is held rigidly in place.

The operation of my attachment is substantially as follows: Supposing the attachment to be sprung or in its normal position, as shown at Fig. 2, then the link-support $C^2$ is raised high enough to lift the projecting end D' of the link so that it will run into the opposite bull-nose, the link resting upon the supporting ends $C^5$, as clearly shown at Fig. 1, the part $C^2$ being prevented from springing back on account of having become locked by the notches in the part G. A series of notches is provided on the part G, so that the link-support $C^2$ can be adjusted to any height. Now upon the link-support being brought up into proper position, as just described, the loops C', moving simultaneously with the lower part $C^2$, works against the hooks or arms E' and causes the upper part E to be lowered, as shown at Fig. 1. The pin H is then set in the opposite bull-nose in about the position shown. Upon the two cars coming together the end D' of the link enters the bull-nose F'. Then the upper part of the arm E strikes the pin H, throwing it into a vertical position, whereupon it drops through the link and the lower hole $F^2$. Next the face $F^3$ of the opposite bull-nose strikes the foremost part $C^2$ of the link-support, causing it to be unlocked or forced off the notched piece G, whereupon it flies or springs back into its normal position, and at the same time causing the upper part E to be thrown back or up, both parts then being out of the way when the two couplings come in actual contact. Otherwise they would be mashed between the couplings.

My attachment can be set in a very much less time than it takes to describe it, as all that is necessary is to raise the link-support quickly with one hand and set the pin H, as shown.

My attachment can be applied at a trifling expense to any form of link-and-pin coupling, and its use would avoid the cause for many of the accidents occurring from hand-coupling.

Having described my invention, what I claim is—

1. In a car-coupling attachment, the combination, with a suitable draw-head, of a link-supporting device, the same consisting of a wire bent substantially as shown and being held normally downward by means of a coiled spring, and a notched piece projecting downward from said draw-head and adapted to hold the link-supporting piece in operative position, substantially as described.

2. In a car-coupling attachment, the combination, with a suitable draw-head, of a link-supporting device, the same consisting of a wire bent substantially as shown and being held normally downward by means of a coiled spring, a notched piece projecting downward from said draw-head and adapted to hold the link-supporting piece in operative position, and an upwardly-projecting arm having downwardly-projecting hooks working in loops forming a continuation of said link-supporting piece, all substantially as shown and described.

In testimony whereof I affix my signature in presence of two witnesses.

WM. H. B. STOUT.

Witnesses:
G. H. DAVIS,
THOMAS J. STALEY.